(12) United States Patent
Gramling et al.

(10) Patent No.: US 10,987,981 B2
(45) Date of Patent: Apr. 27, 2021

(54) TIRE DEMOUNTING MEASUREMENT TOOL

(71) Applicants: Compagnie Generale des Etablissements Michelin, Clermont-Ferrand (FR); Frank Gramling, Simpsonville, SC (US); Justin Russell, Pendleton, SC (US); Joel Neff, Simpsonville, SC (US); Jesse Otto, Easley, SC (US)

(72) Inventors: Frank Gramling, Simpsonville, SC (US); Justin Russell, Pendleton, SC (US); Joel Neff, Simpsonville, SC (US); Jesse Otto, Easley, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 306 days.

(21) Appl. No.: 16/333,641

(22) PCT Filed: Sep. 19, 2017

(86) PCT No.: PCT/US2017/052228
§ 371 (c)(1),
(2) Date: Mar. 15, 2019

(87) PCT Pub. No.: WO2018/063858
PCT Pub. Date: Apr. 5, 2018

(65) Prior Publication Data
US 2019/0210414 A1    Jul. 11, 2019

Related U.S. Application Data

(63) Continuation of application No. PCT/US2016/054697, filed on Sep. 30, 2016.

(51) Int. Cl.
*B60C 25/02*    (2006.01)
*B60C 25/05*    (2006.01)

(52) U.S. Cl.
CPC ............ *B60C 25/02* (2013.01); *B60C 25/056* (2013.01); *B60C 25/0548* (2013.01); *B60C 25/0551* (2013.01)

(58) Field of Classification Search
CPC . B60C 25/02; B60C 25/0548; B60C 25/0551; B60C 25/056
See application file for complete search history.

(56) References Cited

U.S. PATENT DOCUMENTS 8,567,471 B1 * 10/2013 Regimbal ............... B60C 25/02
157/1.3
2005/0223856 A1    10/2005 Reynertson
(Continued)

OTHER PUBLICATIONS

European Patent Office; International Search Report and Written Opinion for patent application PCT/US2016/054697; dated Jun. 29, 2017; Publisher: European Patent Office, Rijswijk, Netherlands, pp. 1-10, enclosed.
(Continued)

*Primary Examiner* — David B. Thomas
(74) *Attorney, Agent, or Firm* — Neal P. Pierotti

(57) ABSTRACT

An apparatus for use in measuring a parameter is provided that includes a pry end, a handle, and a sensor that detects a parameter imparted onto the apparatus when the handle is grasped and the pry end is between a tire and a wheel. An output member is also included that outputs the parameter received from the sensor. The handle, the sensor and the output member are part of an electronic torque wrench.

16 Claims, 8 Drawing Sheets

(56) References Cited

U.S. PATENT DOCUMENTS

2011/0278037 A1 11/2011 Cutler
2014/0020848 A1 1/2014 White
2014/0223741 A1 8/2014 Corghi

OTHER PUBLICATIONS

European Patent Office; International Search Report and Written Opinion for patent application PCT/US20171052228; dated Dec. 19, 2017; Publisher: European Patent Office, Rijswijk, Netherlands, pp. 1-10, enclosed.

* cited by examiner

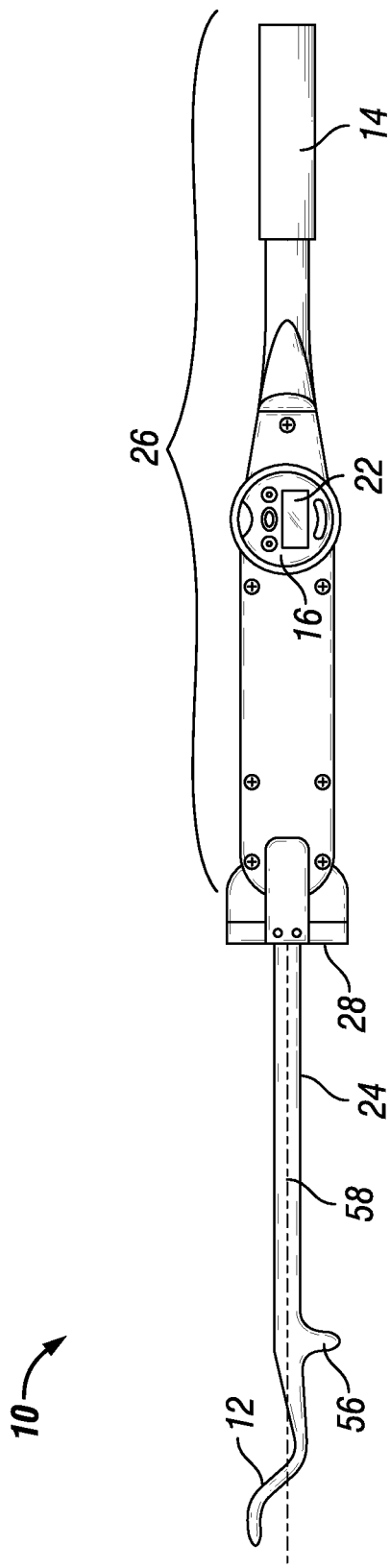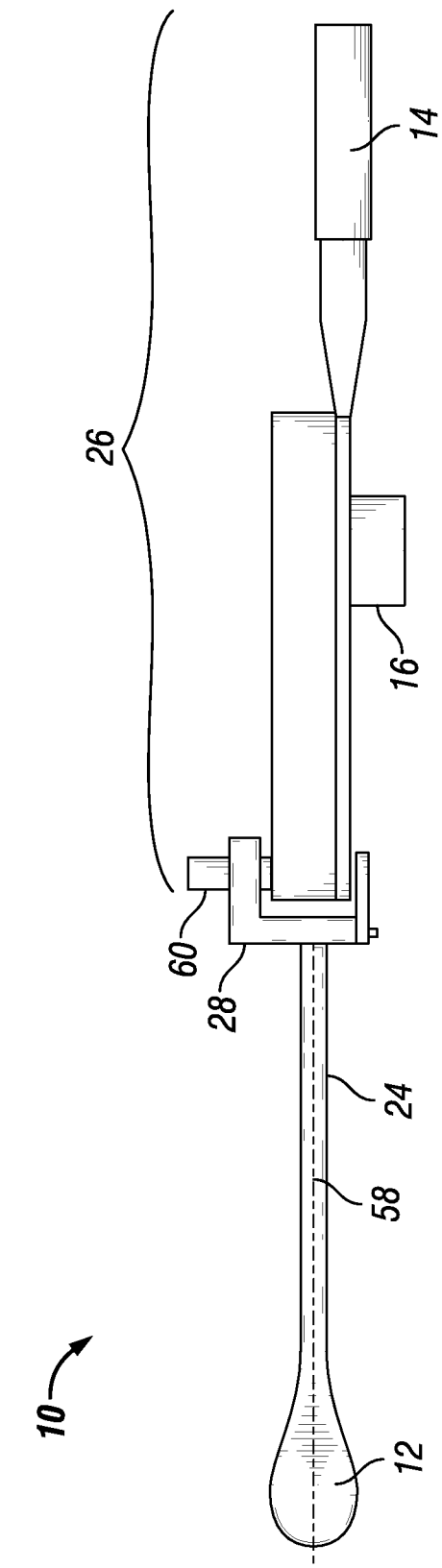

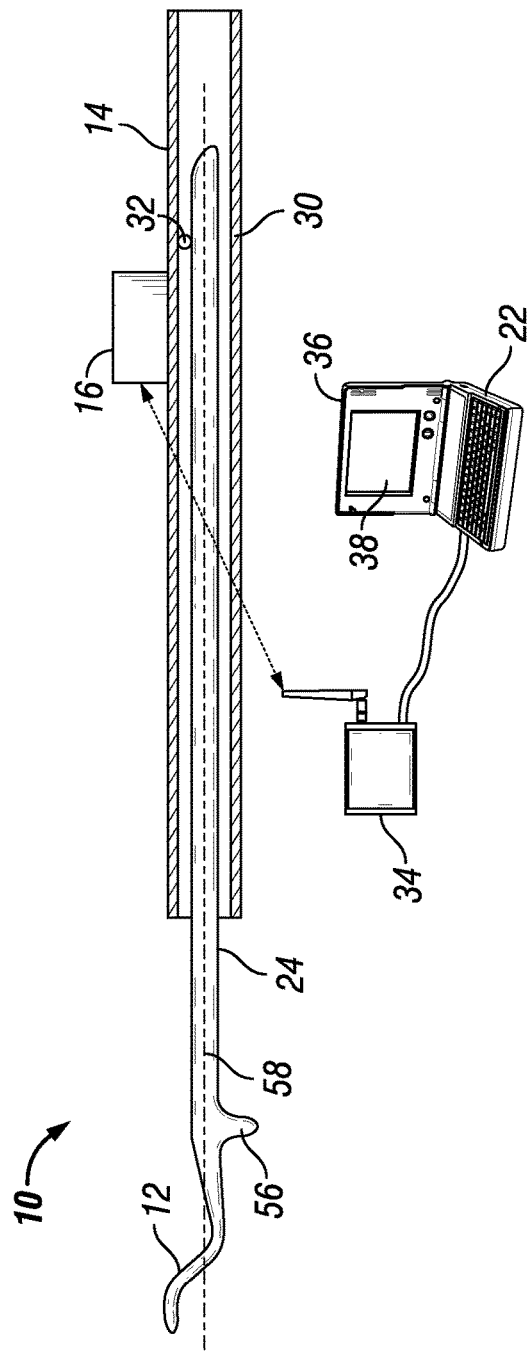
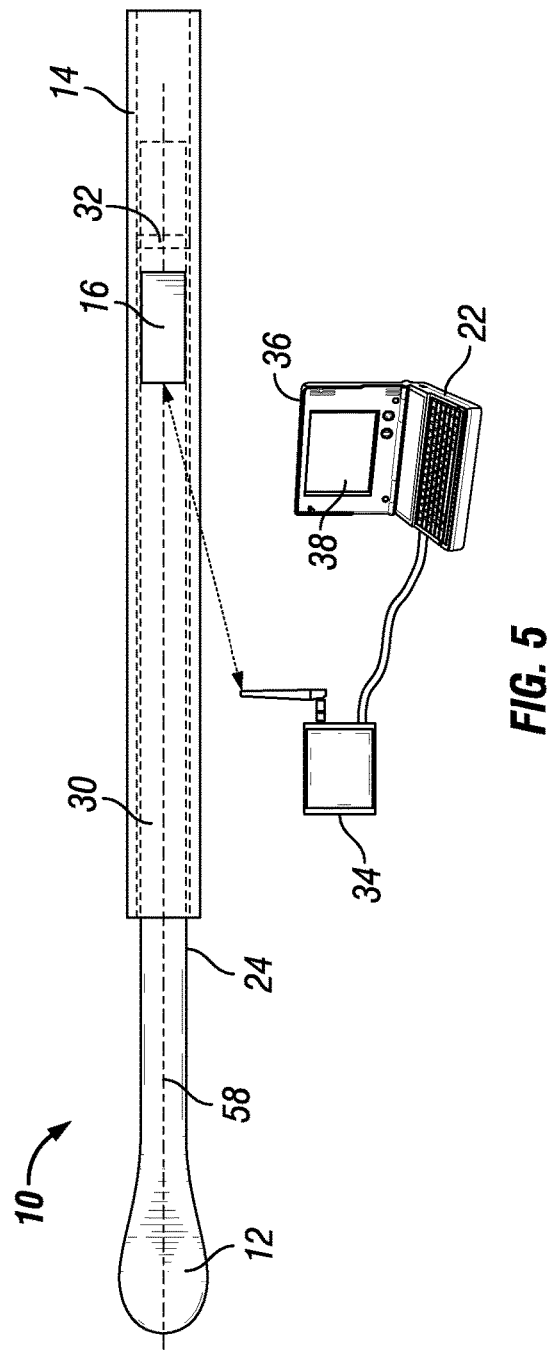
FIG. 4
FIG. 5

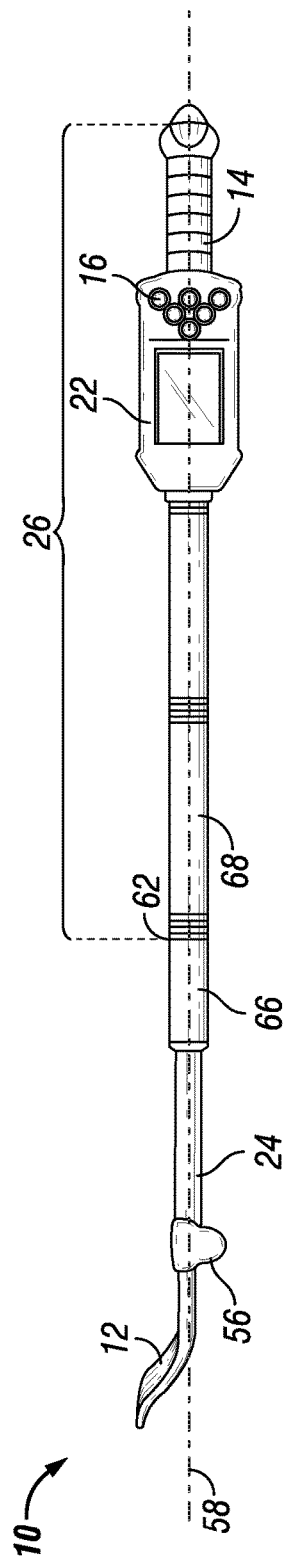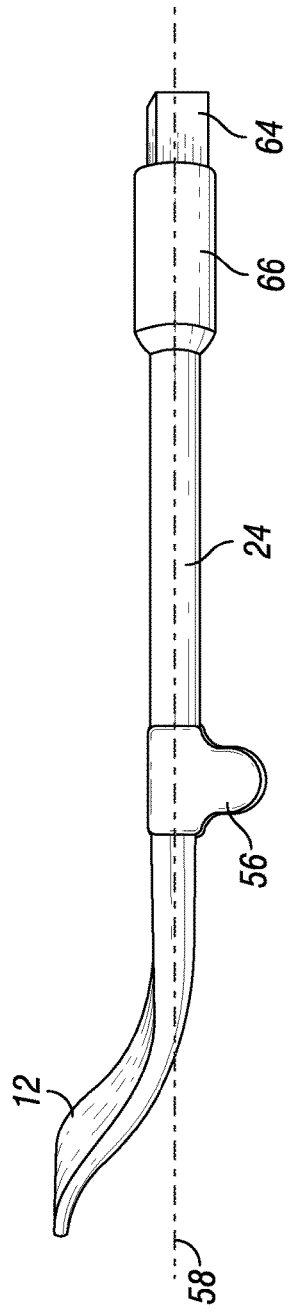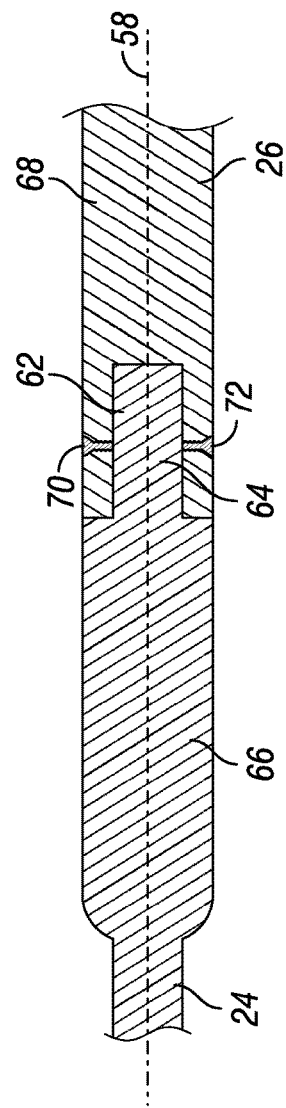
FIG. 11
FIG. 12
FIG. 13

TIRE DEMOUNTING MEASUREMENT TOOL

CROSS-REFERENCE TO RELATED APPLICATIONS

The present application is a 35 U.S.C. § 371 application of PCT/US17/52228 filed on Sep. 19, 2017 and entitled "Tire Demounting Measurement Tool." PCT/US17/52228 claims the benefit of PCT/US16/54697 filed on Sep. 30, 2016 and entitled "Tire Demounting Measurement Tool." PCT/US17/52228 and PCT/US16/54697 are both incorporated by reference herein in their entireties for all purposes.

FIELD OF THE INVENTION

The subject matter of the present invention relates to a tool for the measurement of tire demounting parameters. More particularly, the present application involves a tire demounting tool that has a sensor that is used to measure dynamic parameters, for example torque, acceleration, pressure, force, imparted onto the tire demounting tool when a tire is demounted.

BACKGROUND OF THE INVENTION

Tires include beads that function to securely grip the tire onto a wheel that has a specific geometry for receiving the tire thereon. Although capable of holding the tire onto the wheel, the bead and wheel arrangement makes it difficult to remove the tire from the wheel and place the tire onto the wheel. Tires can be mounted onto wheels through automated machines, such as at an automotive factory, in which the tire is placed onto the wheel and is inflated through the opening between the wheel and the tire. Other methods of mounting a tire to a wheel, or demounting the tire from the wheel, include the use of a dedicated tire mounting machine. These dedicated tire mounting machines may be found at tire repair shops and spin the wheel and tire and have an overhead arm that removes the tire or pushes it onto the wheel as desired.

Manual methods are also known for the demounting of tires. These manual methods involve the use of two tire irons that are driven between the bead of the tire and the wheel. The tire irons are elongated metal members that may be forced between the tire and the wheel. Hammers may be used to strike the tire irons and drive them between the tire bead and the wheel. The pressure forces causing the tire to be held onto the wheel may require a hammer be used to position the pry end between the bead of the tire and the wheel. Once inserted, both tire irons are manually pushed in order to lift the bead over the rim of the wheel. Next, one of the tire irons is held in place while the second tire iron is pushed around the bead to remove the bead from the wheel. Although manual methods exist for the removal of a tire from a wheel, there are no manual methods in place that allow one to determine forces or other parameters associated with the manual demounting of a tire from a wheel. As such, it is not known how much force is needed to manually demount different types of tires from different types of wheels.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 is a side view of a hand held demounting tool.

FIG. 3 is a top view of the hand held demounting tool of FIG. 2.

FIG. 4 is a side view in partial cross-section of a hand held demounting tool in accordance with another embodiment having a sensor in wireless communication with a base station.

FIG. 5 is a top view of the hand held demounting tool of FIG. 4.

FIG. 11 is a side view of a hand held demounting tool in accordance with another exemplary embodiment.

FIG. 12 is a side view of the shaft and pry end sections of the tool of FIG. 11.

FIG. 13 is a cross-sectional view showing the connection between the shaft and the end of the electronic torque wrench.

The use of identical or similar reference numerals in different figures denotes identical or similar features.

DETAILED DESCRIPTION OF THE INVENTION

Figure 1:
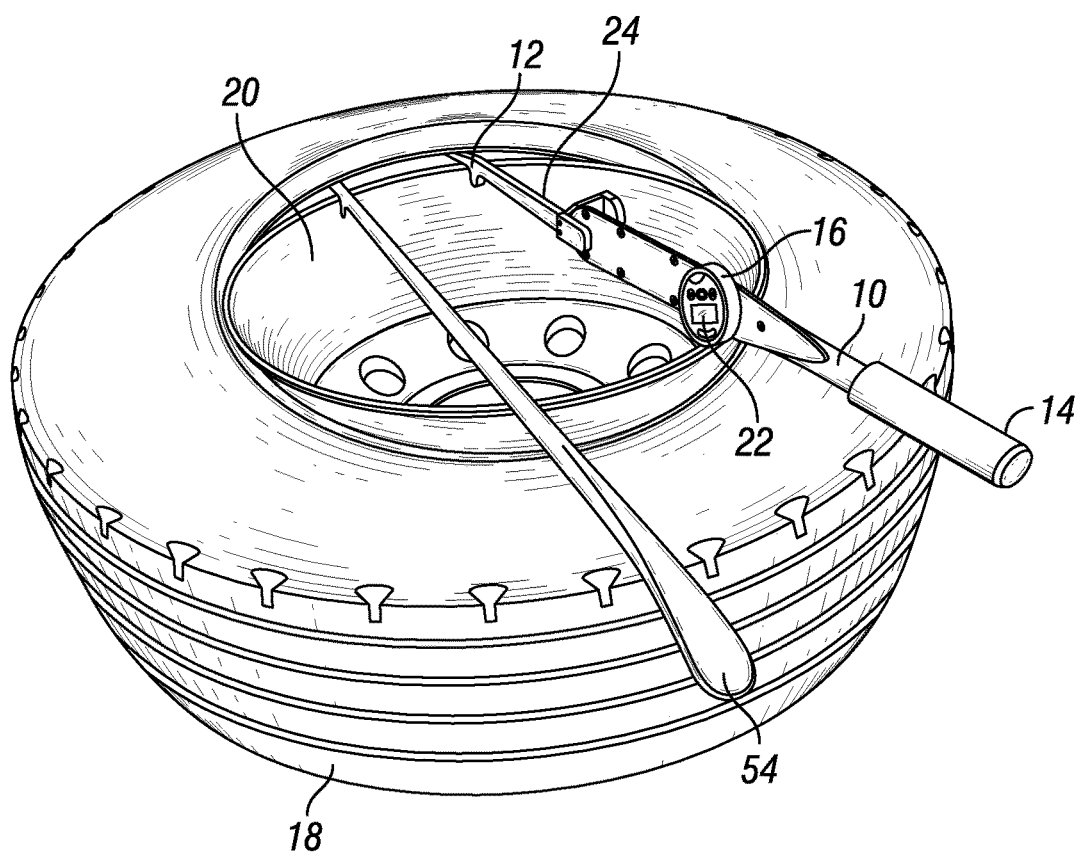
FIG. 1 is a perspective view of a tire being demounted from a wheel via a pair of hand held demounting tools.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

An apparatus 10 is provided that allows for the measurement of one or more parameters, for example force, pressure, strain, or torque, that are imparted onto the apparatus 10 when it is used to demount a tire 18 from a wheel 20. The measured parameter can be output by the apparatus 10 to provide insight on the particular magnitude of the parameter necessary to demount the tire 18. The apparatus 10 can be hand held by the user such that it must be grasped and manipulated by hand in order to effect removal of the tire 18. The apparatus 10 is arranged so that force or other parameters are measured during demounting, but this measurement does not affect the tire 18 demounting process. The apparatus 10 results in a measurement of forces or other parameters that are needed in order to demount a tire 18 from a wheel 20 using manual tire irons or other manual, hand-held devices. Obtaining demounting parameters from different tires 18 on the same or different wheels 20 allows for comparisons to be made between the necessary demounting parameters exhibited between tires 18 of different constructions.

FIG. 1 shows a tire 18 being dismounted from a wheel 20 by a pry bar 54 and by the apparatus 10. The pry bar 54 can be a tire iron that has a pry end and a handle in which the pry end is pushed between the wheel 12 and tire 18, and in which the handle of the pry bar 54 can be pushed to in turn lever the tire 18 away from the wheel 20. Although the process of demounting the tire 18 shown in FIG. 1 utilizes a pry bar 54 and apparatus 10, it may be the case that two of the apparatuses 10 are used instead of one apparatus 10 and one pry bar 54 in other versions. In the illustrated embodiment, the apparatus 10 and pry bar 54 can be used to demount the tire 18 by the constant application of pressure by the pry bar 54, while the user simultaneously levers the apparatus 10 around the interface between the bead of the tire 18 and the wheel 20. The tire 18 can then be lifted up and over the rim of the wheel 20 all the way around its circumference in order to effect removal. In other embodiments, a single apparatus 10 can be used to demount the tire 18 from the wheel 20, and it is to be understood that the apparatus 10 used herein may be implemented by itself or any other combination of pry bars 54 or apparatuses 10 in order demount the tire 18.

One exemplary embodiment of the apparatus 10 is illustrated in FIGS. 2 and 3, and this embodiment is the one previously shown in FIG. 1. The apparatus 10 includes a handle 14 that can be grasped and manipulated by the user in order to move the apparatus 10 and in order to position it with respect to the tire 18 and wheel 20, and to apply force onto the apparatus 10 to cause the tire 18 to be lifted from the wheel 20. The apparatus 10 also includes a shaft 24 that is an extended member that can be made out of a fairly rigid material, such as aluminum or steel, and may have any cross-sectional shape. The shaft 24 may extend any length along its longitudinal axis 58, and it is to be understood the longitudinal axis 58 may be present even if the cross-sectional shape of the shaft 24 is not circular or circular like. The longitudinal axis 58 may extend through the center of the cross-section of the shaft 24 either along its entire length, or along only a portion of the length of the shaft 24 if the cross-section changes or if it does not extend in a linear fashion.

A pry end 12 is located at the end of the shaft 24 and has a different cross-sectional shape than the shaft 24. The pry end 12 may also be wider than the shaft 24, and may be located farther from the longitudinal axis 58, in a direction measured perpendicular to the longitudinal axis 58, than any portion of the shaft 24. As shown, the pry end 12 moving away from the shaft 24 first dips down and then dips up and then somewhat flattens. Some, but not all portions of the pry end 12 are located farther from the longitudinal axis 58 than all of the portions of the shaft 24, such that no portion of shaft 24 is located farther from longitudinal axis 58 than all portions of the pry end 12. With reference to FIG. 3, the pry end 12 also is wider than the shaft 24 such that no portion of shaft 24 is located farther from the longitudinal axis 58 than the pry end 12 in the direction measured perpendicular to the longitudinal axis 58 in FIG. 3. The pry end 12 is shaped in such a manner that it facilitates placement between the tire 18 and wheel 20 and so that it facilitates lifting the tire 18 when pressure is applied. The pry end 12 and the shaft 24 may be integrally formed with one another, or could be two separate parts that are formed and subsequently attached, and may be made out of the same material, such as steel or aluminum, or may be a different material.

The apparatus 10 can also include a stop member 56 that may be integrally formed with the shaft 24 or pry end 12, or could be a separate piece that is subsequently welded thereon or otherwise attached thereto. The stop member 56 may extend farther from the longitudinal axis 58 than all portions of the shaft 24 in a direction measured perpendicular to the longitudinal axis 58. In use, the user may position the pry end 12 between the tire 18 and wheel 20. The bead retaining forces and the geometry of the tire 18 and wheel 20 may prevent the pry end 12 from being pressed between them. A hammer or other object may be used to hit the apparatus 10 in order to force the pry end 12 between the tire 18 and the wheel 20 when a large amount of force is necessary to get the pry end 12 between these two elements 18, 20. In other embodiments, the pry end 12 can simply be forced into place without the need to hit the apparatus 10. The stop member 56 provides a stopping surface that prevents further penetration of the pry end 12 between the tire 18 and wheel 20. The stop member 56 can thus allow the pry end 12 to be in a known position during the process.

The apparatus 10 also includes a sensor 16 and an output member 22. In use when the user grasps handle 14 and applies force to handle 14 to pry the tire 18 off of the wheel 20, a parameter of removal is measured by the sensor 16. In one embodiment, the parameter that is measured is torque. The sensor 16 may measure the amount of torque imparted onto the apparatus 10 when demounting the tire 18. The sensor 16 can be in communication with an output member 22 that can display the amount of torque, or other parameter sensed, by the sensor 16. The output member 22 in some instances may in addition to displaying the sensed torque information, transfer it to a processor or other display either wirelessly or through a wired connection. The sensor 16 can be a torque sensor in some embodiments, but may be any type of sensor capable of measuring a parameter received from the demounting process. The measurement of torque by the sensor 16 allows on to ascertain the amount of torque necessary for the demounting of the tire 18. This torque can be measured at one stage of the demounting process, or may be measured at various points when demounting the tire 18 from wheel 20.

The apparatus 10 can be constructed in a variety of manners. As shown in the FIGS. 1-3 embodiments, the apparatus 10 is made from an electronic torque wrench 26. The electronic torque wrench 26 has a male input 60 onto which sockets or other tighteners can be affixed. In use, the electronic torque wrench 26 can register the amount of torque that is applied to the fastener that is tightened by the socket so that the correct amount of, or so that a known amount of, torque is applied to the fastener. The apparatus 10 can make use of the electronic torque wrench 26 so that instead of having a socket or other tightener affixed to the male input 60, an adapter 28 is present that functions to instead attach the shaft 24, and consequently the pry end 12, to the male input 60. Forces acting upon the pry end 12 will be transferred through the shaft 24 and adapter 28 into the male input 60 so that the electronic torque wrench 26 will be able to read the torque imparted onto the apparatus 10 by the demounting process. Any type of electronic torque wrench 26 can be used in assembling the apparatus 10. For example, the electronic torque wrench 26 may be an electronic dial torque wrench provided by Van F. Belknap Company, Inc. having offices located at 29164 Wall Street, Wixom, Mo. 48393, USA.

The adapter 28 functions to connect the shaft 24 to the male input 60 so that rotation of the shaft 24 is translated to the male input 60. The shaft 24 can be welded or otherwise attached to a plate of the adapter 28. The plate in turn can be received onto the male input 60 to attach the male input 60 to the shaft 24. Any variety of adapters can be used in other embodiments. Also, although described as being constructed with the use of an electronic torque wrench 26, non-electronic torque wrenches can be used in other embodiments. Still further, an electronic torque wrench 26 need not be employed in yet other designs in which the sensor 16 and output member 22 are configured in different arrangements and are put into communication with the shaft 24. The apparatus 10 can be hand held via the handle 14 and used to measure torque imparted onto the device as measured from the pry end 12 to the handle 14. The torque can be measured and output in units of Newton meters. The output member 22 can output the real time torque measured, or can output the peak-hold torque that is measured. The data output by the output member 22 may be on-board, real time, and peak hold torque, and the data may be manually recorded.

Another embodiment of the apparatus 10 is illustrated with reference to FIGS. 4 and 5. The apparatus 10 includes a shaft 24 that extends in the direction of the longitudinal axis 58 with a pry end 12 integrally formed therewith or otherwise attached thereto. A stop member 56 is also included and may be present to assist in limiting the driving of the pry end 12 between the tire 18 and wheel 20. A tube 30 surrounds the shaft 24 and extends in the longitudinal direction so that the longitudinal axis 58 extends through the tube 30 and is surrounded by the tube 30 with respect to the portions of the shaft 24 that are located within the tube 30. The opposite end of the tube 30 is open, but may be capped or otherwise closed off. A pivot pin 32 is disposed between the tube 30 and the shaft 24 such that the pivot pin 32 engages both the shaft 24 and the tube 30. The pivot pin 32 may be rotationally mounted to the tube 30 or to the shaft 24, or may be non-rotationally fixed into position between these two members 24, 30. The shaft 24 may exhibit some degree of movement about the pivot pin 32 relative to the tube 30 when the handle 14 is grasped and the apparatus 10 used to pry the tire 18.

Although shown as employing a pivot pin 32, the pivot pin 32 need not be present in other arrangements of the apparatus 10 with the shaft 24 and tube 30. A sensor 16 is located on the exterior of the tube 30 and records parameters that are transferred from the tire 18 interaction with the pry end 12 that moves through the shaft 24 and then through the handle 14. The sensor 16 can be located forward of the pivot pin 32 so that the sensor 16 is located between the pivot pin 32 and the pry end 12 in the longitudinal direction of the shaft 24 that extends along the longitudinal axis 58. Also located on the exterior surface of the tube 30 is the handle 14. The handle 14 may include a rubber grip or could be made of the same material and be a portion of the tube 30. The shaft 24 does not extend all the way through the tube 30 but instead terminates short of the terminal distal end of the tube 30. In instances where the tube 30 is circular, and where the shaft 24 has a circular cross-sectional shape, the tube 30 may be concentric with the shaft 24.

The sensor 16 may include a three axis accelerometer that measures the static or dynamic accelerations imparted onto the apparatus 10 during use. These acceleration forces may be measured in units of meters per second squared, or may be measured in G forces. Also, the sensor 16 can include a load cell that can measure force applied to the tube 30 through the demounting process. The force measured by the sensor 16 may be in only one axis of direction in some embodiments. The force that is measured may be in units of Newtons. In other embodiments, the sensor 16 can be a load cell that measures torque or pressure applied to the tube 30 through the demounting process. The sensor 16 may further sense the strain imparted onto the apparatus 10 through demounting. The strain measured is a dimensionless quantity that measures how much a given deformation differs locally from a rigid-body deformation. The sensor 16 in some exemplary embodiments may be a Lord MICROSTRAIN® SG-LINK® RGD-LXRS® analog input sensor node supplied by Lord Sensing having offices located at 459 Hurricane Lane, Suite 102, Williston, Vt., 05495 USA.

Information that is detected by the sensor 16 may be wirelessly transmitted to a wireless base station 34. The wireless base station 34 in some embodiments may be a Lord Microstrain WSDA® Base 101 LXRS® model likewise supplied by Lord Sensing. The wireless base station 34 can be a wireless data collection gateway that receives data output by the sensor 16. The wireless base station 34 in some embodiments may be a part of the output member 22, or may be a part of the sensor 16 in other embodiments, or may not be a part of either of these two elements 16, 22 in yet additional exemplary embodiments. Data from the wireless base station 34 can be transmitted to a pc 38 that may be part of the output member 22. This data transfer can be wireless or through a wired connection. The pc 36 receives the measured data from the wireless base station 34 and displays it on the display 38. The pc 36 may additionally process the measurement data and can store it or subsequently transfer it or display it as desired. The data output by the output member 22 can be data recorded for a three axis accelerometer in addition to a one dimensional strain output. Although shown with a wireless base station 34, it is to be understood that the sensor 16 may directly transfer the measured parameter to the pc 36 without the use of a wireless base station 34. Still further, the apparatus 10 need not be wireless but instead a hard wired connection can exist between the sensor 16 and the pc 36.

Figure 6:
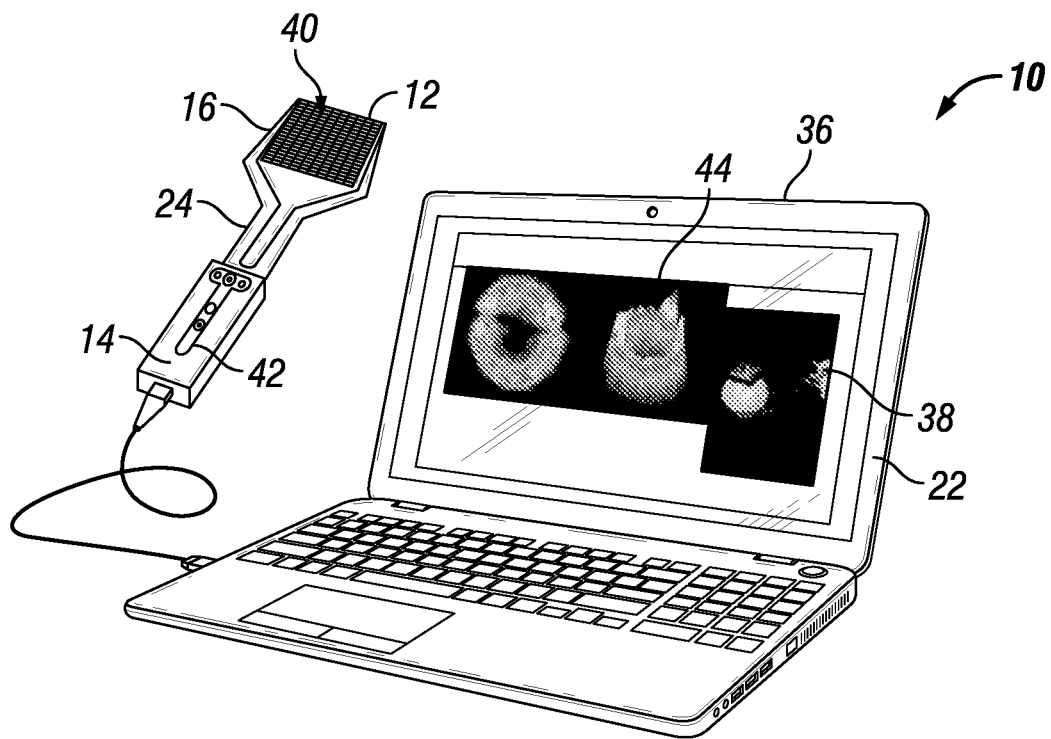
FIG. 6 is a perspective view of a hand held demounting tool in accordance with another embodiment that can map parameters of the demounting process.

Another embodiment of the apparatus 10 is shown in FIG. 6 in which the apparatus 10 can map the parameters exerted on the apparatus 10 during demounting. The apparatus 10 includes a handle 14 that is grasped by the user and used to manually position the apparatus 10 for demounting. A shaft 24 extends from the handle 14 and a paddle like pry end 12 extends in turn from the shaft 24. The shaft 24 and handle 14 may be made of plastic, metal, composite materials, or some combination of same. The sensors 16 are located on the pry end 12 and are provided as an array of sensors 40 that can be positioned in a rectangular arrangement that may be square in some instances. When the array of sensors 40 engage the tire 18 or wheel 20 during demounting, parameters, such as forces or pressures, are imparted onto the array of sensors 40. This information is detected by data acquisition electronics 42 that are mounted to or otherwise incorporated into the handle 14 and/or the shaft 24. The data acquisition electronics 42 may be part of the output member 22, or could be considered another portion of the apparatus 10 in other embodiments. In yet other arrangements, the data acquisition electronics 42 do not exist and information obtained by the array of sensors 40 is directed transmitted to a pc 36 or other output member 22.

In the disclosed arrangement, the data acquisition electronics 42 are in hard wired communication with a pc 36 that is part of the output member 22. Information from the data acquisition electronics 42 is transferred to the pc 36 by this hard wired connection and the pc 36 can store, display, or process the transferred and senses data. The pc 36 has a display 38 onto which the obtain data can be displayed. The data from the array of sensors 40 can be used to display a map of pressure 44 exerted in the demounting process so that the location and intensity of pressure can be visually seen on display 38 or other portion of the output member 22. Although described as a map of pressure 44, other parameters that are measured by the array of sensors 40 can also be mapped besides pressure such as force, acceleration, torque, or strain. The array of sensors 40, shaft 24, handle 14, and data acquisition electronics 42 may be an I-SCAN® pressure mapping system as provided by TEKSCAN®, Inc. having offices located at 307 West First Street, South Boston, Mass., 02127-1309, USA.

Figure 7:
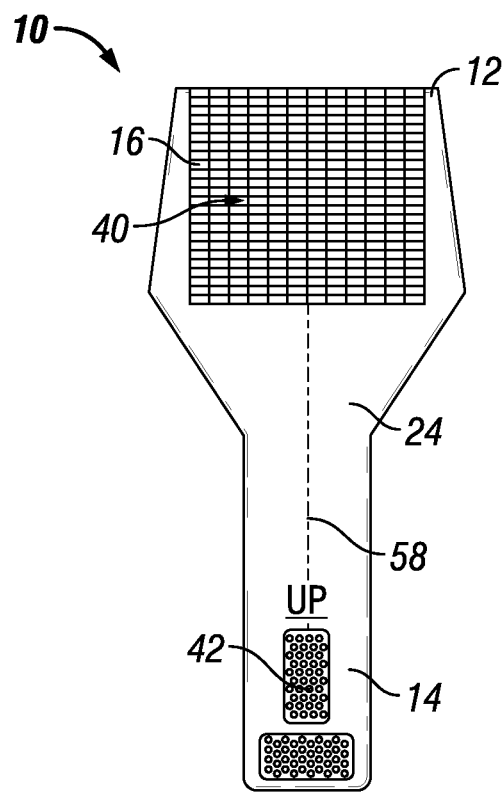
FIG. 7 is a front view of a hand held demounting tool that can map parameters of the demounting process in accordance with another embodiment.

The pry end 12, shaft 24 and handle 14 are shown in FIG. 7, and the array of sensors 40 are arranged in a generally square configuration on the pry end 12. The array of sensors 40 can be on one side of the pry end 12, or may be located on both the front and back sides of the pry end 12. Further, the array of sensors 40 could additionally be located on the left hand and/or right hand side of the pry end 12 in yet other arrangements. The shaft 24 is the portion of the apparatus 10 that extends between the pry end 12 and the handle 14 and may be included in both the thinner portion that includes the handle 14 and in the extended portion that resembles a paddle, or the shaft 24 may be limited to being in only one of those areas. Additional sensors 16 could be included in the handle 14, and the data acquisition electronics 42 may or may not be located on or in the handle 14.

Figure 8:
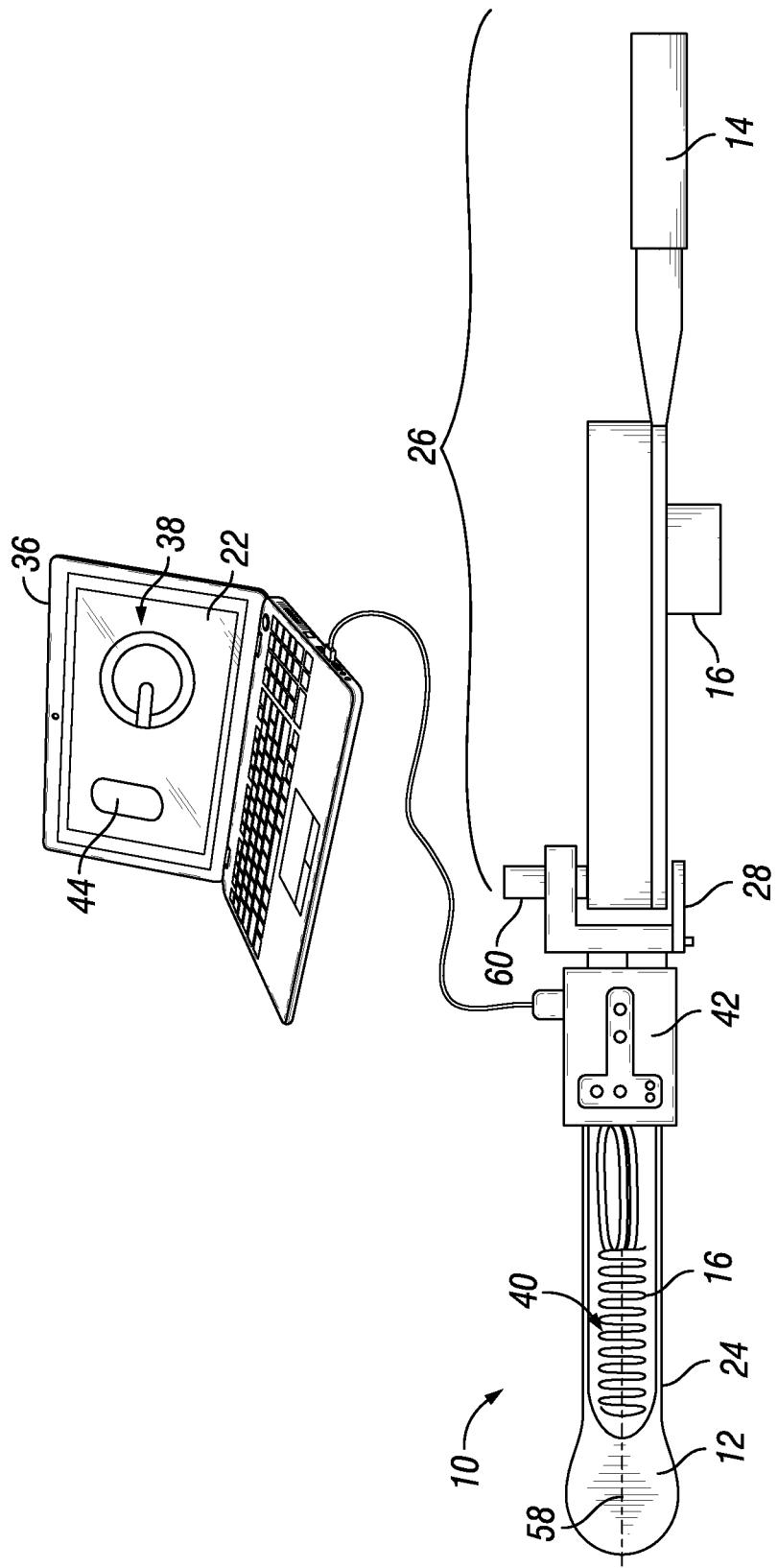
FIG. 8 is a top view of the hand held demounting tool that can also map parameters of the demounting process in accordance with another embodiment.

FIG. 8 shows another version of the apparatus 10 in which the pry end 12 is shaped differently from that in FIG. 7. The shaft 24 extends from the adapter 28 and has a constant width until widening at the pry end 12. The shaft 24 can be curved in certain areas in the vertical direction as shown in the side view of FIG. 9. The data acquisition electronics 42 may be attached to the shaft 24 through a variety of mechanisms such as ties, bolts, hook and loop fasteners, or any other type of mechanical connection. A cable may attach the data acquisition electronics 42 to a pc 36 so that data can be transferred between these two components 36, 42. In other embodiments, a wireless link can be established between the data acquisition electronics 42 and the pc 36 so that data acquired by the sensor 16 sent to the data acquisition electronics 42 may be wirelessly transmitted to the pc 36. In these arrangements, wireless transmitters and receivers can be incorporated into the data acquisition electronics 42 and the pc 36.

The sensor 16 is attached to the upper end of the shaft 24. The sensor 16 includes an array of sensors 40 that have a footprint that fills almost the entire upper surface of the shaft 24. The array of sensors 40 stop short of the pry end 12 so that they are not located on the portion of the pry end 12 that is wider than the rest of the shaft 24. In other embodiments, the array of sensors 40 can be located on the pry end 12. The array of sensors 40 can extend in the longitudinal direction towards the data acquisition electronics 42 but stop short of the data acquisition electronics so that there is a space between. Electrical leads can extend from the array of sensors 40 to the data acquisition electronics 42 to place these two into communication so that information sensed is transferred. The array of sensors 40 may be attached of the shaft 24 in any suitable manner. In the side view of FIG. 9, other portions of the electronic torque wrench 26, shaft 24, sensor 16, and the data acquisition electronics 42 are shown. The array of sensors 40 may be located on only on the top side of the shaft 24 and not on the lower side, right side, left side, or front side.

Figure 10:
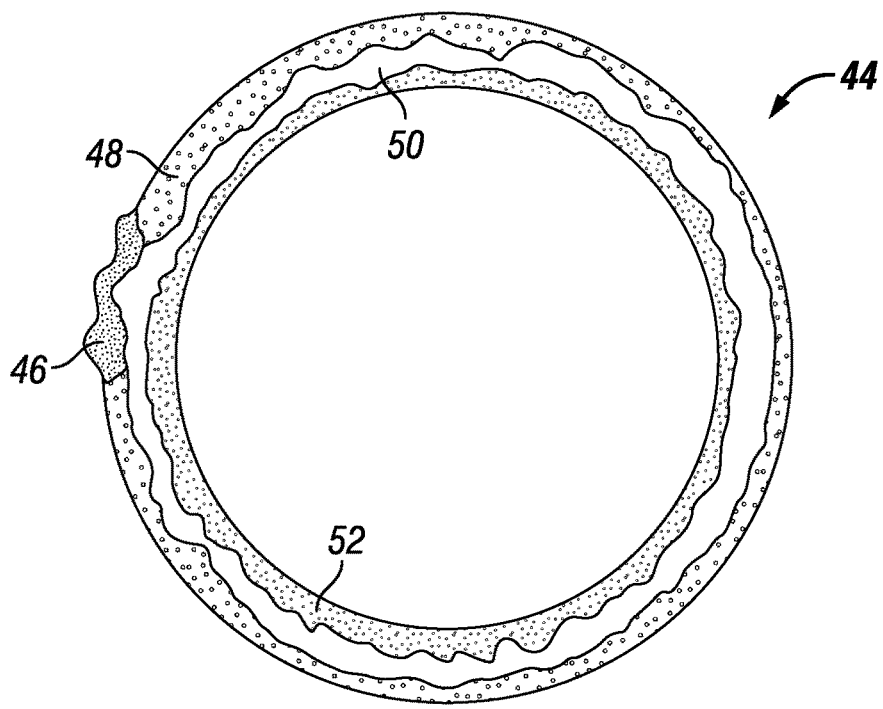
FIG. 10 is a map of pressures detected by the hand held demounting tool when demounting a tire from a wheel.
Figure 9:
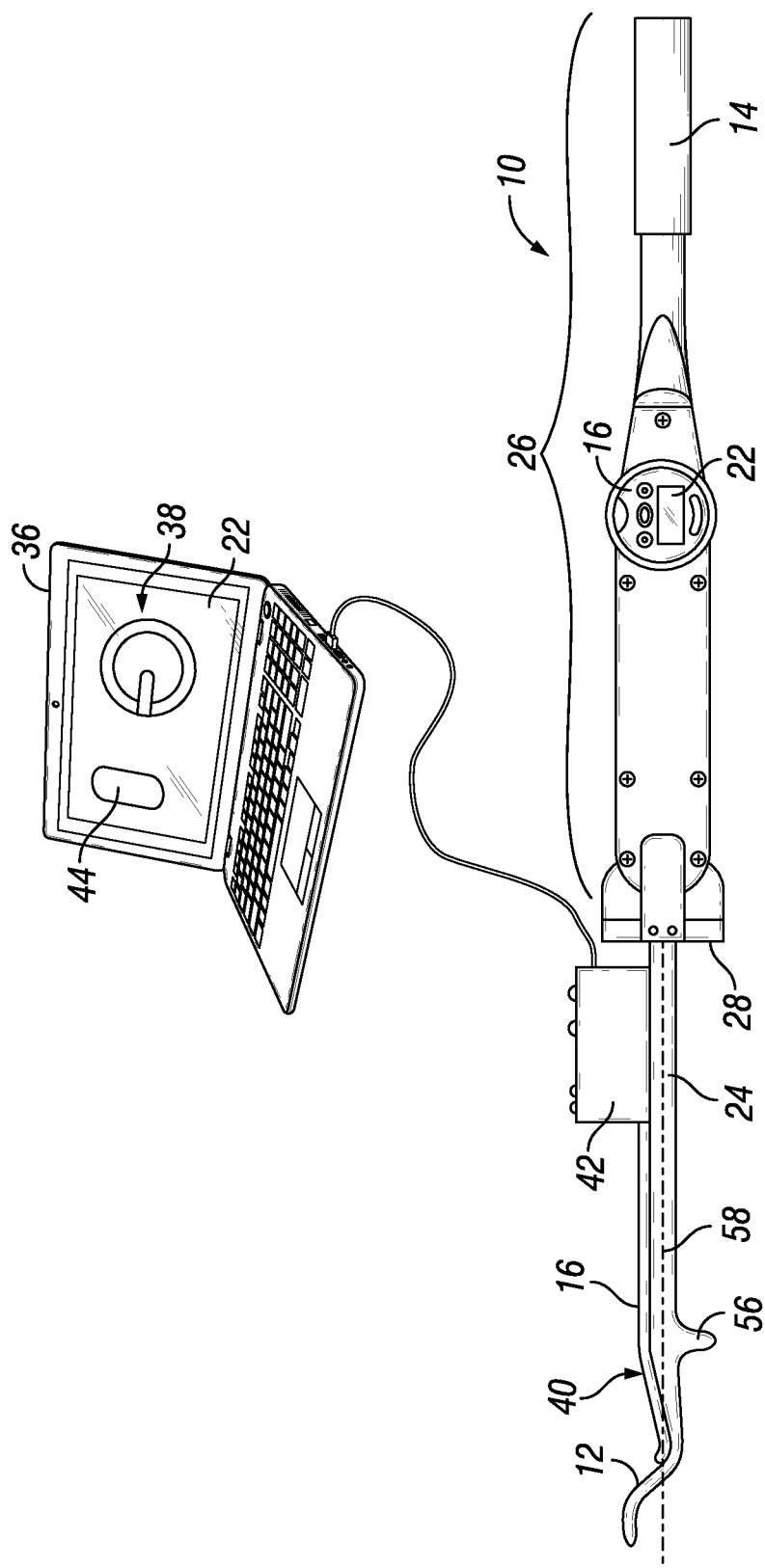
FIG. 9 is a side view of the hand held demounting tool of FIG. 8.

Data collected by the array of sensors 40 can be transmitted to the pc 36 and displayed as a map of pressure 44 as shown in FIG. 10. Different zones of pressure can be identified by color or by other indexing to differentiate between magnitudes or directions of pressure. A first pressure level 46 is shown at an edge of the map 44 and may represent the maximum amount of pressure imparted onto the pry end 12 when initially being forced between the tire 18 and wheel 20 and lifting the bead of the tire 18 up and off of the rim of the wheel 20. Continued force application by the pry end 12 against and between the tire 18 and wheel 20 around the wheel 20 causes various pressures to be exerted onto the tire 18 that are different in magnitude and location as sensed by the array of sensors 40. A second pressure level 48 may be sensed by the sensors 16 in the array of sensors 40 farthest form the handle 14, and this second pressure level 48 may be less intense than the first pressure level 46 and extend across a majority, but not all, of the circumference of the map of pressure 44. A third pressure level 50 that is less intense than the second pressure level 48 may extend all the way around the circumference of the map of pressure 44, and thus all the way around the tire 18 and wheel 20 during demounting. The second and third pressure levels 48, 50 represent readings from sensors 16 of the array of sensors 40 that are intermediate in location on the array of sensors 40 along the longitudinal axis 58 if the longitudinal axis were extended through the pry end 12. A fourth pressure level 52 that is less in intensity than the third pressure level 50 also extends along the entire circumference of the map of pressure 44 and represents readings from the array of sensors 40 that are closest to the handle 14. It is to be understood that the mapping of the pressures of the map of pressure 44 is only exemplary and that other various maps can be generated through the demounting process in which more and less intense pressure levels are located at different locations and in different shapes and amounts from what is illustrated in FIG. 9. Further, although described as outputting a map of pressure 44, the apparatus 10 in the disclosed embodiment may cause the output member 22 to output only the peak force, the maximum pressure, or any other parameter without, or in combination with, the creation of a map of pressure 44. The data output by the output member 22 may be real time and recorded graphic pressure maps 44 and can be data tables. When the parameter is pressure, the pressure can be measured in pounds per square inch.

In other embodiments, the apparatus 10 may be arranged so that the electronic torque wrench 26 is a FREEDOM3™ electronic torque wrench provided by SCS Concept Americas LLC having offices located at 1700 Harmon Road, Suite 3, Auburn Hills, Mich., 48326, USA. This electronic torque wrench 26 can have an output member 22 that is a high resolution touch screen and can output data from the output member 22 to an additional output member 22 such as the pc 36. The capacity of this electronic torque wrench 26 can be from 15-1200 Newton meters, and can function not only as a torque wrench but may also function as an angle wrench. The smart breakaway, breakaway peak, breakaway angle, minimum torque, and loose torque can be obtained by the electronic torque wrench 26. Additionally, fast torque, fast angle, fast yield, fast yield angle, and sequential work out can be obtained. The output member 22 can show on the display 38 a torque vs. time curve, a torque vs. angle curve, and statistical evaluation management of XR charts and trend control. The output member 22 on the electronic torque wrench 26 itself may display curve analysis direction on the wrench 26, and zoom function directly on the wrench 26.

Another exemplary embodiment of the apparatus 10 is shown with reference to FIG. 11 in which the electronic torque wrench 26 used is a Freedom 3 torque wrench provided by SCS Concept Americas LLC having offices located at 1700 Harmon Road, Suite 3, Auburn Hills, Mich., 48326, USA. The electronic torque wrench 26 may have a 100 Nm capacity, a 200 Nm capacity, or other levels of capacity in accordance with various exemplary embodiments. The shaft 24 is attached to a receiving end 62 of the electronic torque wrench 26, and a pry end 12 is located at the opposite end of shaft 24. The apparatus 10 can be used in the same manner as previously discussed to obtain data on the tire 18 demounting. The electronic torque wrench 26 used in this embodiment may provide continuous torque data. It may be the case that previously discussed electronic torque wrenches 26 used in previous embodiments were only capable of capturing the peak torque measurement obtained during demounting. In the presently discussed embodiment, both rotation angle and torque may be obtained for demounting. The electronic torque wrench 26 may measure peak torque, average torque, the slope of the torque curve, and/or changes in the slope of the torque curve. As such, in the presently disclosed embodiment, more than one parameter of the demounting process may be measured and recorded.

The shaft 24 and pry end 12 are shown detached from the electronic torque wrench 26 in FIG. 12 and can be integrally formed with one another thus making up a single piece. The shaft 24 has an enlarged section 66 located proximate to an end 64 of the shaft 24 that is opposite the pry end 12. The enlarged section 66 has a greater diameter than a longitudinally longer portion of the shaft 24 that is between the pry end 12 and the enlarged section 66. The end 64 may be a solid component that has a rectangular cross-sectional shape. In some instances the cross-sectional shape of the end 64 is square, and in other instances it may be triangular, hexagonal, or circular in shape. FIG. 13 is a cross-sectional view showing the connection between the shaft 24 and the electronic torque wrench 26. The electronic torque wrench 26 has a receiving end 62 that has a recess that extends in the longitudinal direction. The end 64 of the shaft 24 is shaped in a complimentary manner to the recess of the receiving end 62. The end 64 may be received within the recess of the receiving end 62, and set screws 70, 72 that extend through the receiving end 62 in the lateral direction may be tightened to further secure the end 64 to the receiving end 62. The end 64 and thus the shaft 24 may be tightly retained to the electronic torque wrench 26 so that no relative movement is made between the shaft 24 and the electronic torque wrench 26 during demounting to result in a more accurate measurement. The enlarged section 66 can have an outer diameter that is the same as the outer diameter of the receiving end 62. The enlarged section 66 may engage the terminal end of the receiving end 62 to further prevent relative movement so that the shaft 24 is more securely held onto the receiving end 62.

Figure 14:
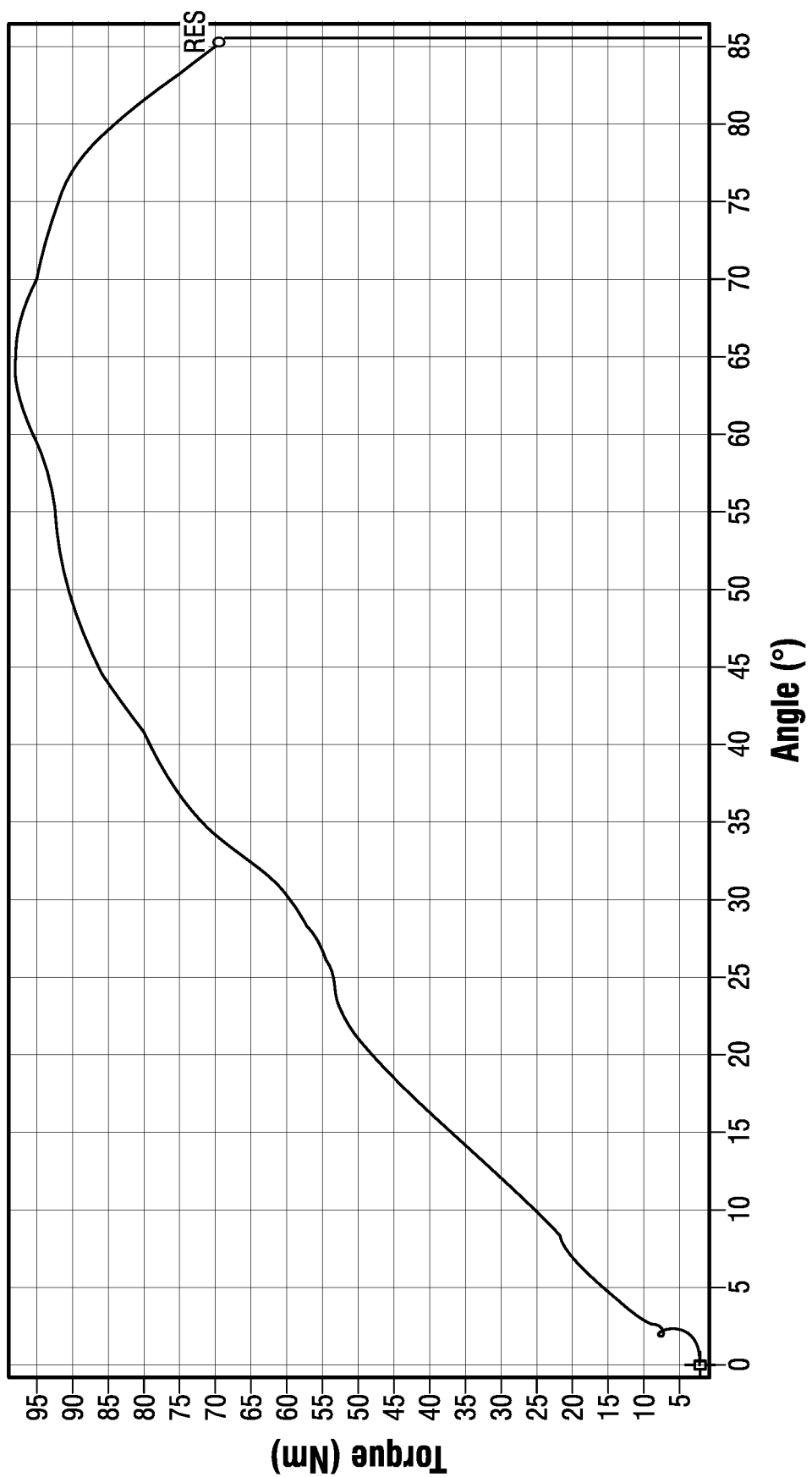
FIG. 14 is a graph of angle vs. torque obtained in one embodiment using the tool of FIGS. 11-13.

FIG. 14 is a plot of angle versus torque for the demounting of a tire 18 using the apparatus 10 of FIGS. 11-13. The angle on the X-axis is output by the electronic torque wrench 26 and is the angle that the shaft 24 is oriented relative to the horizontal in some embodiments, and in other embodiments is the starting angle upon the pry end 12 being placed between the rim and the tire 18. The angle of the shaft 24 changes as the apparatus 10 is manipulated to remove the tire 18 from the rim during the tire 18 dismount event. The torque is measured and recorded by the electronic torque wrench 26 at each angle the shaft 24 is moved to and is plotted on the Y-axis against the angle on the X-axis. The apparatus 10 in other embodiments could record the peak torque which is the highest torque measured during the demounting event, the average torque during the demounting event, the slope of the torque curve during the demounting event, and/or the changes in the slope of the torque curve during the demounting event. While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for use in measuring a parameter, comprising:
a pry end;
a handle;
a sensor that detects a parameter imparted onto the apparatus when the handle is grasped and the pry end is between a tire and a wheel; and
an output member that outputs the parameter received from the sensor;
wherein the parameter is detected when the handle is grasped and force is applied to demount the tire from the wheel, wherein the handle is hand held such that the apparatus is hand held.

2. The apparatus as set forth in claim 1, further comprising a shaft integrally formed with the pry end.

3. The apparatus as set forth in claim 1, wherein the parameter that is detected by the sensor is torque, and wherein the output member visually displays the amount of torque detected by the sensor.

4. The apparatus as set forth in claim 1, wherein the handle, the sensor, and the output member are part of an electronic torque wrench, and further comprising an adapter that attaches the pry end to the electronic torque wrench, wherein the output member visually displays a peak hold detected by the sensor.

5. The apparatus as set forth in claim 1, wherein the sensor is a three-axis accelerometer.

6. The apparatus as set forth in claim 5, wherein the sensor also includes a load cell.

7. The apparatus as set forth in claim 6, wherein the parameters that are detected by the sensor includes static acceleration forces, dynamic acceleration forces, and strain.

8. The apparatus as set forth in claim 5, further comprising:
a shaft that extends from the pry end;
a tube that surrounds the shaft, wherein the sensor engages the tube; and
a pivot pin positioned between the tube and the shaft.

9. The apparatus as set forth in claim 5, wherein the sensor is a wireless sensor node, wherein the output member has a wireless base station that receives sensor data wirelessly from the wireless sensor node, wherein the output member has a pc that receives the sensor data from the wireless sensor node and displays the wireless sensor data onto a display of the pc.

10. The apparatus as set forth in claim 1, wherein the sensor is an array of sensors located on the pry end, and wherein the parameter that is measured is pressure, wherein the pressure is measured over the area of the array of sensors.

11. The apparatus as set forth in claim 10, wherein the output member has data acquisition electronics that receive sensor data from the array of sensors, wherein the output member has a pc, wherein the sensor data is transmitted by the data acquisition electronics to the pc, wherein a real time map of pressure over the area of the array of sensors is displayed by the pc.

12. The apparatus as set forth in claim 1, wherein the sensor is a load cell and wherein the parameter that is measured is force.

13. The apparatus as set forth in claim 1, wherein a shaft is integrally formed with the pry end and has an end that is received within a receiving end of an electronic torque wrench that includes the sensor.

14. The apparatus as set forth in claim 1, wherein the parameter that is output is at least one of continuous measures of angle versus torque, peak torque, average torque, slope of a torque curve, and change in slope of a torque curve.

15. An apparatus for use in measuring a parameter, comprising:
a pry end;
a handle;
a sensor that detects a parameter imparted onto the apparatus when the handle is grasped and the pry end is between a tire and a wheel; and
an output member that outputs the parameter received from the sensor;
wherein the handle, the sensor, and the output member are part of an electronic torque wrench, and further comprising an adapter that attaches the pry end to the electronic torque wrench, wherein the output member visually displays a peak hold detected by the sensor.

16. An apparatus for use in measuring a parameter, comprising:
a pry end;
a handle;
a sensor that detects a parameter imparted onto the apparatus when the handle is grasped and the pry end is between a tire and a wheel; and
an output member that outputs the parameter received from the sensor;
wherein the sensor is an array of sensors located on the pry end, and wherein the parameter that is measured is pressure, wherein the pressure is measured over the area of the array of sensors.

* * * * *